United States Patent
Petersen

(10) Patent No.: US 10,734,897 B2
(45) Date of Patent: Aug. 4, 2020

(54) POWER EFFICIENT DRIVER CIRCUIT USING CHARGE RECOVERY

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 16/700,279

(22) Filed: Dec. 2, 2019

(65) Prior Publication Data

US 2020/0106356 A1 Apr. 2, 2020

Related U.S. Application Data

(63) Continuation of application No. PCT/EP2018/064265, filed on May 30, 2018.

(30) Foreign Application Priority Data

Feb. 26, 2018 (DE) .......................... 0 2018 202 871

(51) Int. Cl.
*H05B 45/37* (2020.01)
*H02M 3/156* (2006.01)
*G09G 3/36* (2006.01)

(52) U.S. Cl.
CPC ............ *H02M 3/156* (2013.01); *H05B 45/37* (2020.01); *G09G 3/36* (2013.01)

(58) Field of Classification Search
CPC .................................................. H02M 3/156
See application file for complete search history.

(56) References Cited

U.S. PATENT DOCUMENTS

| | | | |
|---|---|---|---|
| 7,928,670 B2 | 4/2011 | Chen et al. | |
| 7,999,487 B2* | 8/2011 | Szczeszynski | H05B 45/37 |
| | | | 315/291 |
| 8,022,680 B2* | 9/2011 | Ryoo | H02M 3/156 |
| | | | 323/282 |
| 8,106,597 B2 | 1/2012 | Mednik et al. | |
| 8,334,662 B2 | 12/2012 | Jin et al. | |

(Continued)

FOREIGN PATENT DOCUMENTS

| | | |
|---|---|---|
| DE | 21 2015 000 247 | 8/2017 |
| DE | 102018 202 871 | 8/2019 |

(Continued)

*Primary Examiner* — Amy Cohen Johnson
*Assistant Examiner* — Syed M Kaiser
(74) *Attorney, Agent, or Firm* — Saile Ackerman LLC; Stephen B. Ackerman

(57) ABSTRACT

A driver circuit and a method for driving a load. The driver circuit has a power supply to provide electrical power at a supply voltage and a PWM control switch to enable and to disable a load current through the load in an alternating manner. In addition, the driver circuit has a storage unit to be charged using the load current through the load. The driver circuit has a sensing unit to provide a charge indication. There is a recycling switch to couple and to decouple the storage unit to or from the power supply. There is a control unit to, repeatedly control the PWM control switch and the recycling switch based on the charge indication and based on a target charge value for the cumulated load current through the load within a cycle.

15 Claims, 12 Drawing Sheets

(56) References Cited

U.S. PATENT DOCUMENTS

| | | | |
|---|---|---|---|
| 9,559,589 B2 | 1/2017 | Petersen | |
| 2003/0016711 A1 | 1/2003 | Crawford | |
| 2010/0001704 A1* | 1/2010 | Williams | H02M 3/157 323/283 |
| 2011/0062872 A1* | 3/2011 | Jin | H05B 45/00 315/122 |
| 2012/0161648 A1 | 6/2012 | Lin et al. | |
| 2012/0242230 A1* | 9/2012 | Jin | H05B 45/35 315/121 |
| 2013/0127344 A1 | 5/2013 | Jin et al. | |
| 2014/0265845 A1* | 9/2014 | Williams | F21S 9/024 315/86 |
| 2015/0333639 A1* | 11/2015 | Strijker | H05B 45/37 315/291 |
| 2017/0098994 A1* | 4/2017 | Ruhm | H05B 45/37 |
| 2017/0231051 A1 | 8/2017 | Jin et al. | |
| 2017/0332448 A1* | 11/2017 | Lookman | H05B 45/50 |
| 2018/0069483 A1* | 3/2018 | Akiyama | H05B 47/155 |
| 2018/0237092 A1* | 8/2018 | Graf | H05B 45/37 |

FOREIGN PATENT DOCUMENTS

| | | |
|---|---|---|
| TW | 2011 10 811 | 3/2011 |
| TW | 2012 28 471 | 7/2012 |
| WO | WO 2019/161940 | 9/2019 |

* cited by examiner

POWER EFFICIENT DRIVER CIRCUIT USING CHARGE RECOVERY

This application is a Continuation of PCT Application No. PCT/EP2018/064265 which was filed on May 30, 2018, assigned to a common assignee, and which is herein incorporated by reference in its entirety.

TECHNICAL FIELD

The present document relates to a driver circuit for a load, notably for an LED string.

BACKGROUND

Over the last years LCD (Liquid Crystal Display) resolution and panel size of applications like smartphones, computer displays, television sets, automotive dashboard and infotainment systems have grown with the demand for backlight solutions having increased brightness and increased illuminated area. As a result, the power required for backlight is rising, despite the fact that LEDs (being a dominant source for backlight) improved their light efficiency in parallel. As LED luminance is proportional to current, uniform brightness across a panel is typically achieved by connecting multiple LEDs in series, i.e. by using LED strings. As the supply voltage for such LED strings may be higher than the supply voltage of the application, a boost converter may be used for converting the base voltage of the application into the supply voltage for the LED strings.

A possible approach to controlling brightness of an LED string is pulse width modulation (PWM) of a duty cycle controlled switch as shown in FIG. 1. FIG. 1 shows a lighting circuit 100 comprising n LED strings (n>1, e.g. n=10, 50, 100 or more). Each LED string may be used to provide backlight for a different segment or sub-region of a display panel. The base or input voltage $V_{in}$ is converted into a supply voltage $V_{bst}$ for supplying the LED strings. The input voltage may be in the range of 3V (e.g. in case of a smartphone), 12V or 24V (e.g. in case of an automotive or TV panel) and the LED string supply voltage may be at 30V, 60V or more. The load current through the different LED strings is controlled using the PWM control switches S31 to S3n, respectively, wherein a PWM control switch is arranged in series with the corresponding LED string.

The PWM control switches may be switched on and off periodically with a refresh frequency or cycle rate of 100 Hz, 200 Hz, 500 Hz or more. Hence, the refresh cycle of a PWM control switch may have a duration or cycle length of 1 ms, 0.5 ms, 0.2 ms or less. The brightness of an LED string may be controlled by controlling the duty cycle of the corresponding PWM control switch, i.e. by controlling the percentage of time that the PWM control switch is on during each cycle. By adapting the duty cycle for different cycles, the brightness of an LED string may be modified for different cycles.

The load current through an LED string is dependent on the supply voltage $V_{bst}$ provided by the boost converter. LEDs typically exhibit manufacturing tolerances with regards to their threshold or dropout voltage. By using LED binning, such manufacturing tolerances may be taken into account to provide LED strings which exhibit similar cumulated threshold or dropout voltages. Nevertheless, different LED strings typically still exhibit different cumulated dropout voltages, which would result in different brightness for the different LED string, when arranged in parallel to the same supply voltage $V_{bst}$, because of the different levels of load currents drawn by the different LED strings. On the other hand, brightness of parallel LED strings can be matched by adapting the PWM duty cycle of the PWM control switches for the different LED strings reversely proportional to the load current drawn by each LED string.

If the PWM control switches are used for compensating the different dropout voltages across the different LED strings and/or for compensating the different load currents through the different LED strings, in order to achieve a uniform brightness for the different LED strings, the dynamic range of the resulting display panel is reduced. The duty cycle of a PWM control switch may be adapted between 0% and X % (e.g. X=50, 60, or more, up to 100) with a resolution of Q bits (e.g. Q=8 or more). The compensation of the different dropout voltages of the different LED strings may require a certain PMW range (e.g. 15-25% of the maximum PWM regulation range), thereby reducing the maximum uniform brightness of the panel by the same amount and/or thereby reducing the remaining resolution for dynamic range control of the display panel (to less than Q bits).

SUMMARY

The present document addresses the technical problem of providing a driver circuit for a load, notably for an LED string, which exhibits low power dissipation and which allows the electric power that is provided to the load to be adjusted with a high resolution, notably in order to provide a display panel exhibiting a high dynamic range. According to an aspect, a driver circuit for driving a load, notably an LED string, is described. The driver circuit comprises a power supply which is configured to provide electrical power at a supply voltage. Furthermore, the driver circuit comprises a PWM control switch which is configured to enable and to disable a load current through the load. In addition, the driver circuit comprises a storage unit which is configured to be charged using the load current through the load, wherein the load, the PWM control switch and the storage unit form a serial arrangement, which is arranged in parallel to the supply voltage. The driver circuit further comprises a sensing unit which is configured to provide a charge indication that is indicative of a cumulated load current through the load. In addition, the driver circuit comprises a recycling switch which is configured to couple or to decouple the storage unit to or from the power supply in an alternating manner, in order to at least partially discharge the storage unit towards the power supply. Furthermore, the driver circuit comprises a control unit which is configured to, repeatedly within a sequence of cycles, control the PWM control switch and the recycling switch based on the charge indication and based on a target charge value for the cumulated load current through the load within a cycle.

According to a further aspect, an application circuit, notably a lighting circuit, is described, wherein the application circuit comprises at least one load, notably at least one LED string. Furthermore, the application circuit comprises the driver circuit which is described in the present document for driving the load.

According to a further aspect, a display panel, notably an LCD panel, is described, which comprises the lighting circuit described in the present document for generating backlight.

According to another aspect, a method for driving a load is described. The method comprises, applying a supply voltage to a serial arrangement of the load, a PWM control switch and a storage unit, using a power supply. The PWM control switch is configured to enable and to disable a load current through the load. Furthermore, the storage unit is configured to be charged with the load current through the load.

The method further comprises, providing a charge indication which is indicative of a cumulated load current through the load. In addition, the method comprises discharging the storage unit at least partially towards the power supply, using a recycling switch. In addition, the method comprises controlling the PWM control switch and the recycling switch repeatedly within a sequence of cycles, based on the charge indication and based on a target charge value for the cumulated load current through the load within a cycle.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As outlined above, the present document addresses the technical problem of providing a power efficient lighting circuit which allows for a high dynamic range. As outlined in the introduction, PWM control switches may be used to provide a PWM control of the brightness of the different LED strings. By adapting the PWM cycle of each LED string individually, the brightness of each LED string may be adapted individually. However, for compensating the varying load currents through different LED strings and for compensating the resulting varying inherent brightness of the different LED stings, at least some of the available range and/or resolution for controlling the PWM control switches may be lost, thereby reducing the dynamic range of a display panel brightness.

Another possibility for individual brightness control of LED strings is the insertion of a regulated current source (IDAC, current digital-to-analog converter) in series with each LED string. The use of IDACs is illustrated in FIGS. 2A to 2D. Each IDAC regulates the voltage drop across the IDAC in order to set the load current through the corresponding LED string to a respective target current. For this purpose, a current sensing unit may be provided, e.g. a current sensing unit comprising a serial sense resistor $R_{S1}$ to $R_{Sn}$ in each LED string. The load current through an LED string may alternatively be sensed using current mirror technology implemented inside the IDAC or inside the PWM control switches S31, S32, . . . , S3n (if used).

The dissipation power of the lighting circuit 100 may be minimized by minimizing the voltage drop across the IDACs (and its sense resistors). This is achieved by controlling the supply voltage $V_{bst}$ of the boost converter such that the IDAC driving the LED string with the highest dropout or threshold voltage is operated at the minimum voltage that enables current regulation of the IDAC. As a result of this, the IDACs of the remaining LED strings exhibit a higher voltage drop.

Figure 1:
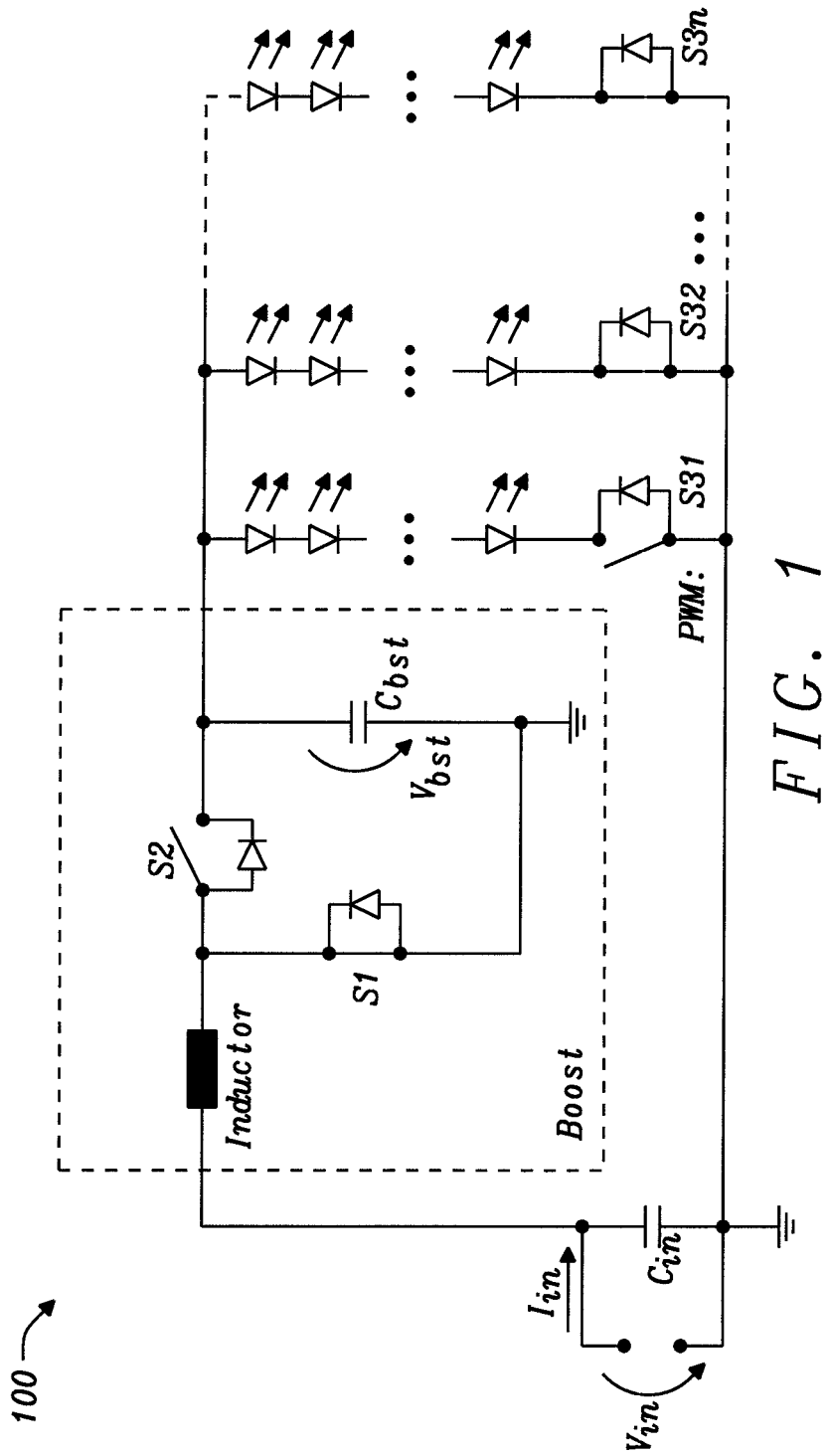
FIG. 1 illustrates an example lighting circuit comprising string control switches.
Figure 2A:
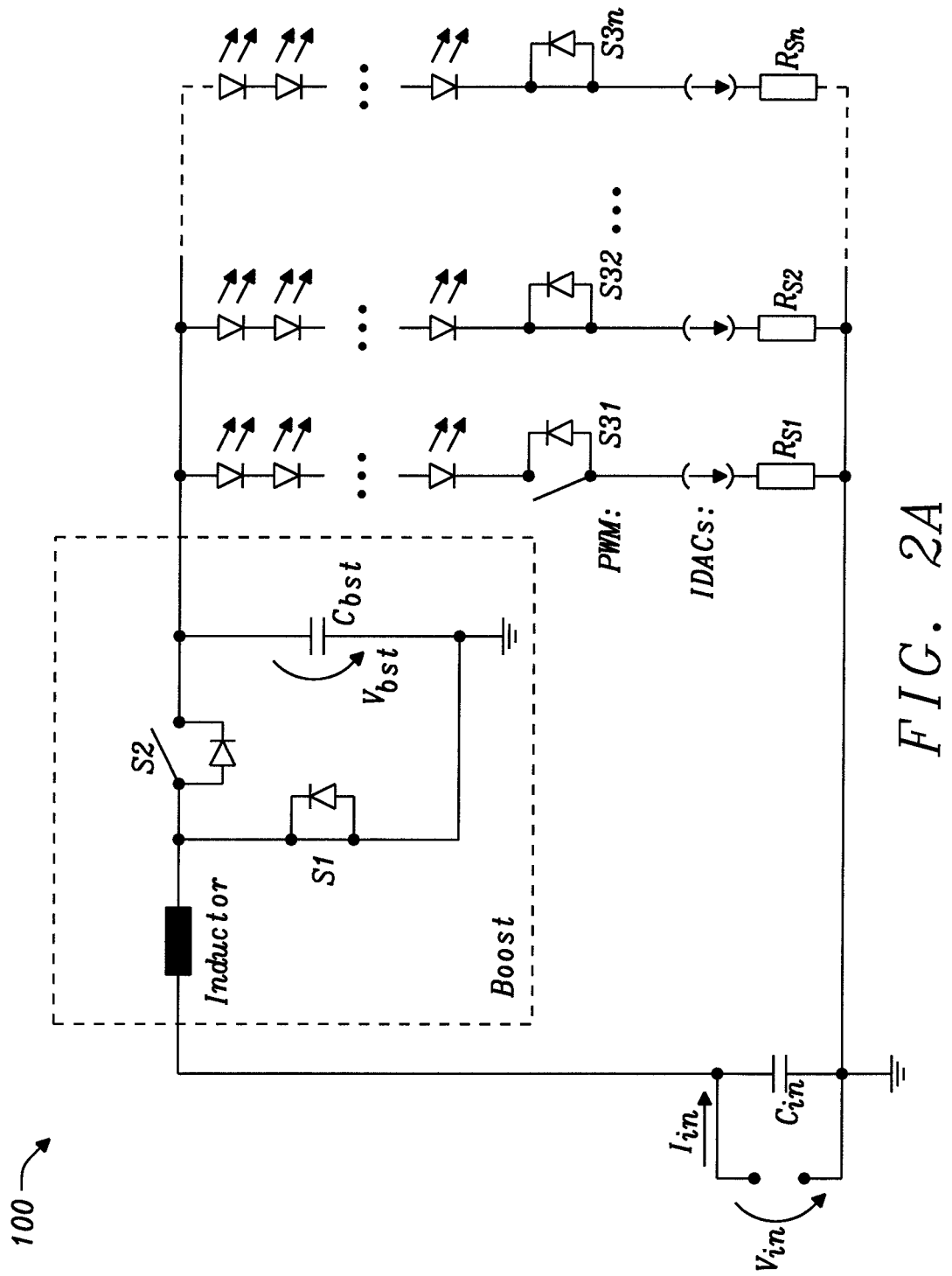
FIGS. 2A to 2D illustrate an example lighting circuit comprising regulated current sources.
Figure 2B:
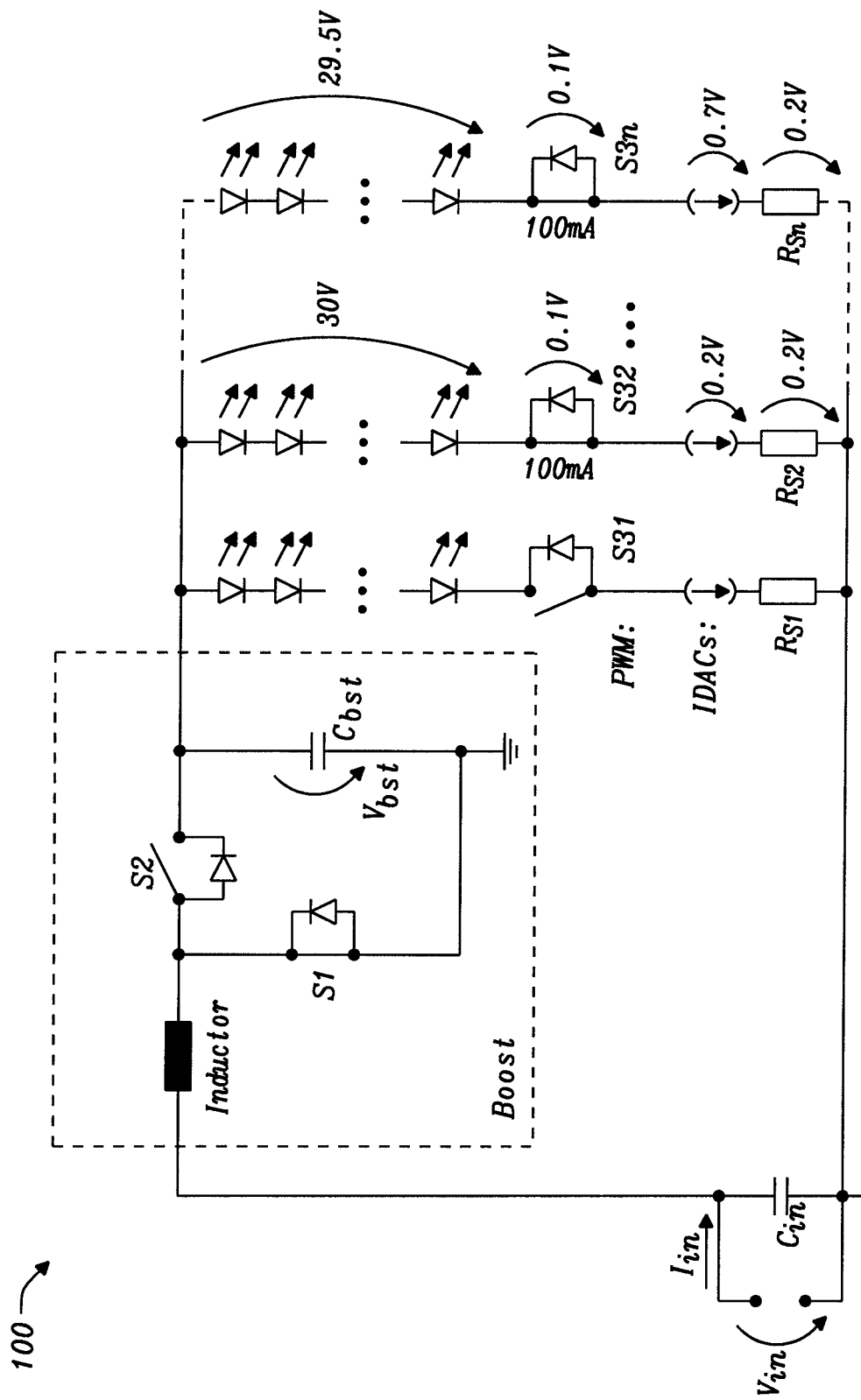

This is illustrated in FIG. 2B, which shows an LED string having a dropout voltage of 29.5V and another LED string having a dropout voltage of 30V. The voltage drop across the PWM control switches S32 and S3n is 0.1V. The IDACs are regulated to set the load current through the LED strings to 100 mA, thereby leading to a voltage drop across the IDACs of 0.2V and 0.7V, respectively. Hence, the use of IDACS leads to an increased power dissipation of the lighting circuit 100. On the other hand, the IDACs allow setting individual target currents for the different LED strings, thereby allowing the PWM control switches to individually set the brightness of the different LED strings at the full PWM range (e.g. indicated by a Q bit value), i.e. thereby increasing the dynamic range of the lighting circuit 100.

Dissipation power of the driver circuit for the LED strings or of the lighting circuit 100 may be reduced, if not regulating the IDACs for the different LED strings to a common target current, but by compensating the variance of the serial LED dropout voltages of the different LED strings using individually adapted PWM duty cycles. This, however, reduces the dynamic range available for PWM control.

Figure 2C:
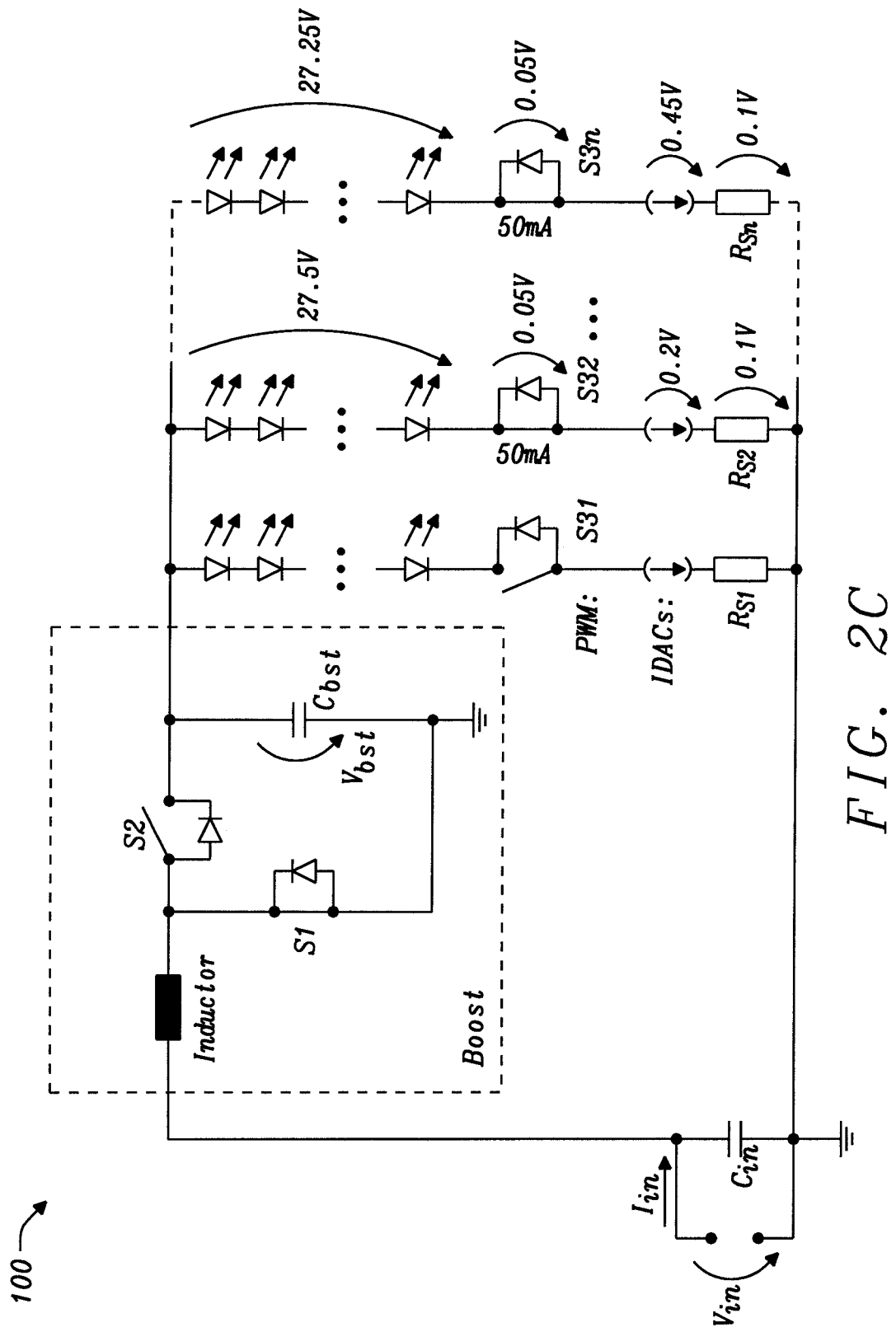

Enhanced (dynamic) contrast may be achieved when the supply voltage $V_{bst}$ of the boost converter is adapted depending on the required brightness of the panel. The required brightness of the panel may be taken from the panel brightness settings. By adapting the supply voltage $V_{bst}$ of the boost converter the load current through all LED strings may be adapted. As illustrated in FIG. 2C, the load voltage $V_{bst}$ may be reduced to reduce the target current from 100 mA to 50 mA, thereby reducing the overall brightness of the LED strings accordingly. Hence, the boost converter may be used to increase the dynamic range of the lighting circuit 100.

Furthermore, the mismatch of the IDAC voltages may be reduced by reducing the overall target current.

Figure 2D:
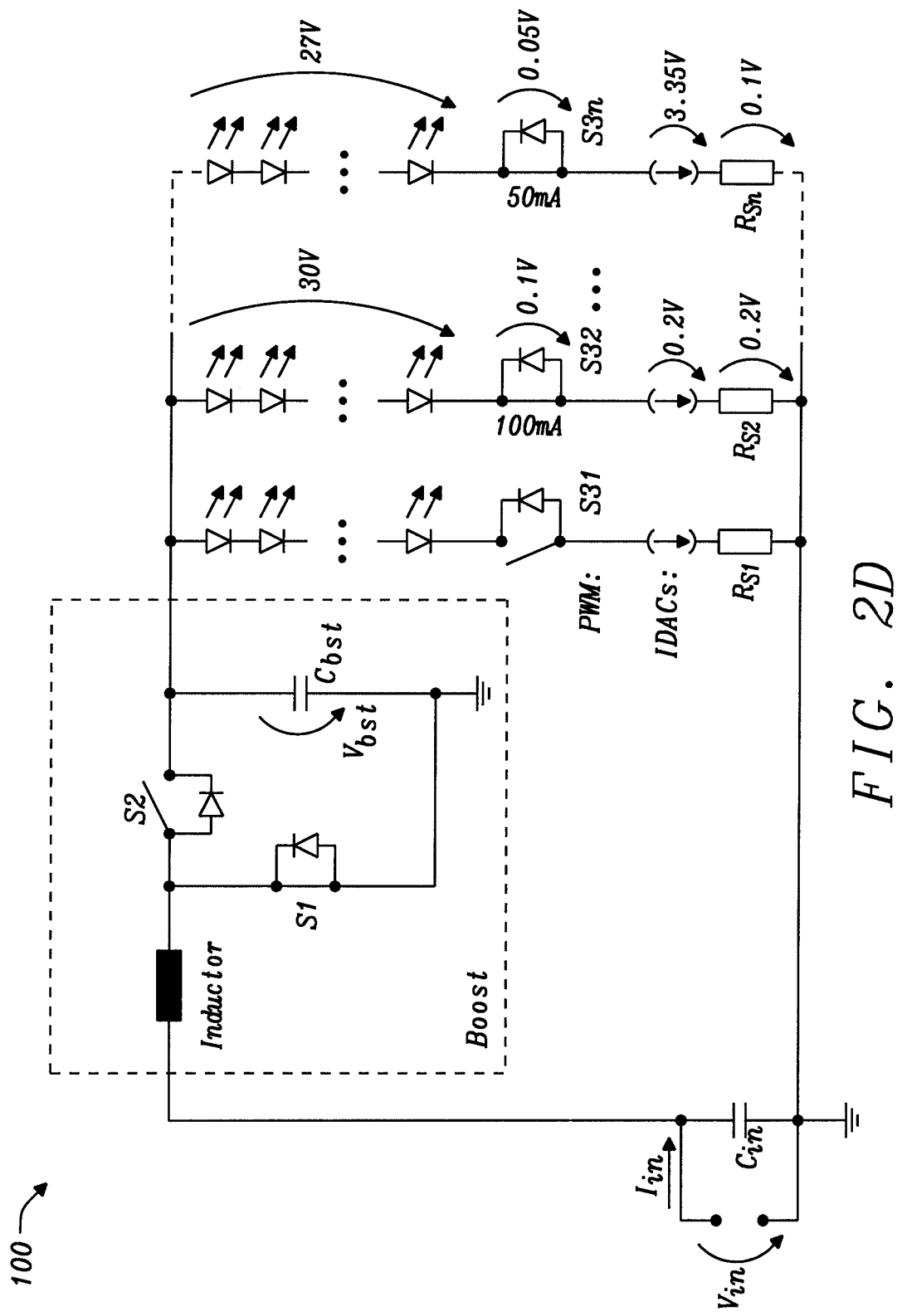

FIG. 2D illustrates a situation, where the brightness of the $n^{th}$ LED string is reduced by the IDAC regulating to a lower (50 mA) load current. As a result of this, the voltage drop across the corresponding IDAC increases significantly (to 3.35 V). This leads to significant dissipation power and the risk of overheating for some applications. The IDAC may be exposed to a voltage of a similar range in case a single LED within the $n^{th}$ LED string is shorted, while the load current through the $n^{th}$ LED string is regulated to the same value as for the parallel LED strings.

In order to provide an LCD panel with High Dynamic Range (HDR), the LCD panel may be subdivided in different sub-regions, wherein each sub-region is illuminated using a corresponding LED string. Local LED dimming within the different sub-regions may be used to increase the dynamic range, thereby enabling very bright and deep black visual content. In order to provide local LED dimming, each LED string may change the (level of the) load current and/or the PWM duty cycle individually to extend the contrast offered by the LCD pixels. The duty cycle of a PWM control switch may be adapted between 0% and X % (e.g. X=10, 50, or more, up to 100) with a resolution of Q bits (e.g. Q=8 or more). The individual regulation of LED string brightness typically requires a resolution of R most significant bits (e.g. R=4 MSBs (Most Significant Bits) or more), thereby reducing the remaining resolution for dynamic range control of the display panel to Q-R bits. The individual adaption of the load currents may be achieved by changing the target currents used by the different IDACs. Driving different LED strings from a common supply voltage but at different target current results, however, in larger voltage differences across the IDACs and by consequence in increased dissipation power.

The brightness of an LED string is typically proportional to the overall electric charge that has traversed the LED string within a refresh cycle. The overall charge through the LED string (i.e. the cumulated load current through the LED string) may be controlled using the PWM cycle (i.e. using the PWM control switches) and/or using the level of the load current (which may be set using e.g. an IDAC). In order to provide an LCD panel with a high dynamic range, the overall electric charge through an LED string should be regulated over a wide range of different target charge values. Furthermore, the overall electric charge should be set individually for the different LED strings of a lighting circuit 100. In view of limited space, multiply LED strings should be supplied using a common power supply (e.g. using a common DC/DC power converter). Furthermore, the power dissipation of the lighting circuit 100 should be reduced.

Figure 3A:
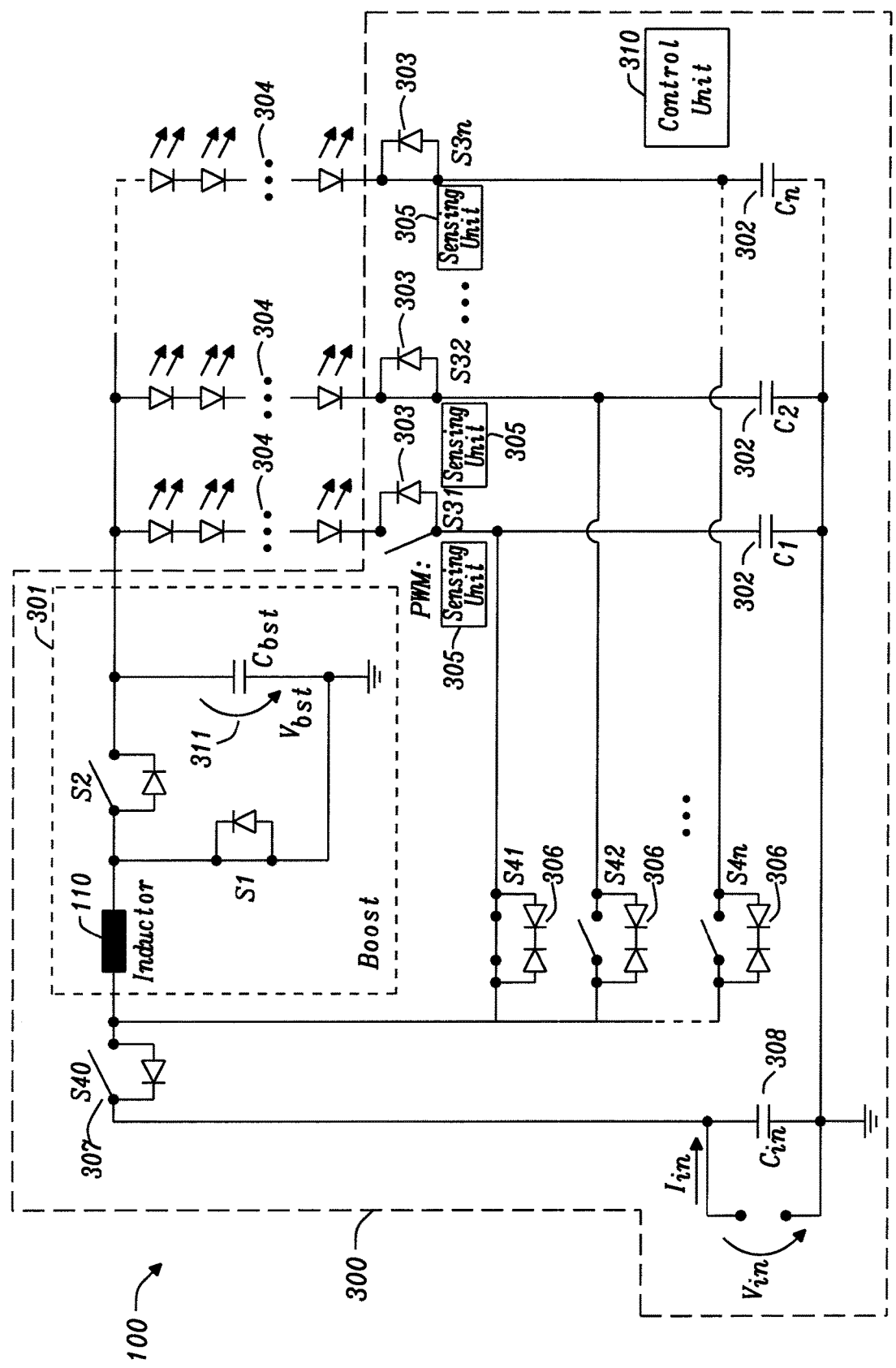
FIGS. 3A to 3C show an example lighting circuit and an example driver circuit comprising storage units.

FIG. 3A shows the driver circuit 300 of a lighting circuit 100. The lighting circuit 100 may comprises the driver circuit 300 in combination with the LED strings 304. The driver circuit 300 comprises storage units 302 (identified as $C_1, C_2, \ldots, C_n$) for storing the electrical charge through the n parallel LED strings. The storage units 302 may each comprise one or more capacitors. The charge stored within a storage unit 302 may be recycled or recovered via a recycling switch 306 (identified as S41, S42, ..., S4n for the n different storage units 302, respectively). As a result of this, power dissipation of the driver circuit 300 may be reduced. At the same time, the PWM control switches 303 (identified as S31, S32, ..., S3n for the n LED strings 304, respectively) may be used at full resolution for adapting the brightness of the corresponding LED strings 304, thereby providing a high dynamic range.

Figure 6A:
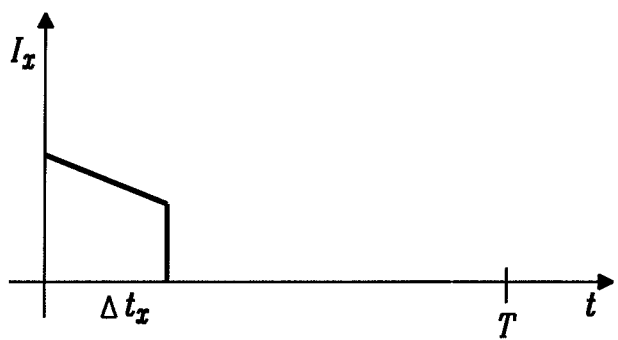
FIG. 6A shows an example load current during a cycle.

The brightness of an LED string 304 $x$ is controlled by the load current $I_x$ provided at a PWM duty cycle $\Delta t_x$, wherein the duty cycle is set by the serial PWM control switch 303 S3$x$ (with $x$ being 1, ..., n). The corresponding storage unit 302 (with a capacitance $C_x$) is charged through the LED string 304 $x$ with a delta charge $\Delta Q = I_x \times \Delta t_x$. This charge changes the storage voltage 312 $V_x$ across the storage unit 302 $C_x$, resulting in a modulated load current through the LED string 304 $x$. FIG. 6A illustrates the load current $I_x$ through the LED string 304 $x$ during a cycle having the cycle duration T. The level of the load current drops from an initial value, as the storage voltage 312 $V_x$ across the storage unit 302 $C_x$ increases. At the end of the on-period of the PWM control switch 303 S3$x$, i.e. subsequent to $\Delta t_x$ of the duration T of the duty cycle, the load current is interrupted, thereby interrupting the increase of the storage voltage 312 $V_x$.

Figure 6B:
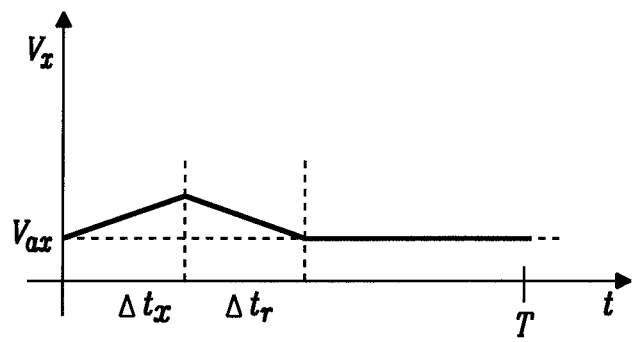
FIG. 6B shows an example storage voltage during a cycle.

To prevent a continuous increase of the storage voltage 312 $V_x$ across the storage unit 302 (in subsequent refresh cycles) a discharge cycle using the additional recycling switch 306 S4$x$ may be used. In the illustrated example, the recycling switch 306 S4$x$ is used to source current into the inductor 110 of the boost converter. The recycling switch 306 S4$x$ may be closed within a refresh cycle (e.g. for a time period $\Delta t_r$, as shown in FIG. 6B), thereby discharging the storage unit 302 $C_x$ and thereby reducing the storage voltage 312 $V_x$.

The change of the storage voltage 312 $V_x$ across the storage unit 302 $C_x$ may be used as an indicator for the brightness of the LED string 304 $x$, in view of $\Delta V_x = \Delta Q / C_x$ (wherein $C_x$ is the capacitance of the storage unit). Hence, the brightness may be controlled using voltage sensing of the storage voltage 312. However, when using relative large capacitance values and/or when using overlapping PWM duty cycles and discharging cycles (e.g. for increased brightness of the LED string 304 $x$), monitoring of the storage voltage 312 $V_x$, may not be sufficiently precise. In such a case, a Coulomb counter may be used for monitoring the charge $\Delta Q$ that has flown through the LED string 304 $x$. The Coulomb counter may be implemented using a relatively small mirror capacitor which is charged with current provided by a current mirror inside the PWM control switch 303 S3$x$.

The duty cycle for discharging a storage unit 302 may be regulated such that the storage voltage 312 $V_x$, across the storage unit 302 allows a certain target current to flow into the corresponding LED string 304 $x$. In particular, the storage voltage 312 $V_x$, across the storage unit 302 may be set individually to compensate for variations of the dropout voltages of the different LED strings 304. The storage voltage 312 may be regulated in accordance to a target voltage $V_{ax}$. In view of the fact that the resulting LED string brightness is regulated by the total charge $\Delta Q$ (which is achieved by adapting the PWM duty cycle), the regulation of the storage voltage $V_x$, typically does not need to be very accurate. The regulation of the storage voltage V, may mainly be based on the maximum current rating of the corresponding LED string 304 and/or a target operating point of the corresponding PWM duty cycle.

The lighting circuit 100 may comprise an isolation switch 307 S40, in order to enable the insertion of current via the recycling switches 306 S41 to S4$n$ into the inductor of the boost converter 301. The isolation switch 307 S40 may be opened, when one of (notably exactly one of) the recycling switches 306 S41, ..., S4$n$ is closed. Hence, the operation of the isolation switch 307 S40 may be synchronized with the operation of the recycling switches 306 S41, ..., S4$n$. Synchronization may not be necessary if the isolation switch 307 S40 is only opened when the inductor current of the power converter 301 is zero (during discontinuous switching).

The back-to-back recycling switches 306 S41 to S4n may be implemented via an anti-serial FET arrangement. During non-overlap time, one of the recycling switches 306 may be used to enable inductor current provision via an enabled body diode conduction.

As illustrated e.g. in FIG. 3A, the recycling switches 306 S41 to S4n may be implemented as back-to-back switches that may be opened (and blocking) independently from the polarity of the voltage that is applied to them. By doing this, the case may be taken into account that the storage voltage 312 across a first storage unit 302 may be (both) higher and/or lower than the storage voltage 312 across another storage unit 302. In such a case, the recycling switch 306 of one LED string 304 would charge or discharge the storage unit 302 of another LED string 304 via the body diode of the CMOS recycling switch 306 (depending on the direction of the body diode), if the recycling switch 306 wasn't able to open independently from the polarity of the voltage across the recycling switch 306. The isolation switch 307 S40 it typically not implemented as a back-to-back arrangement (as long as $V_{in}$ is higher than any one of the storage voltages 312 across the storage units 302).

As already outlined above, the total current of the LCD backlight may require the boost converter 301 to operate in continuous conduction mode. To prohibit the above mentioned short of storage units 302 via the recycling switches 306 S41, . . . , S4n, the control unit 310 may be configured to introduce a blanking-time between opening a first recycling switch S4x and closing a following second recycling switch S4x+1. However, the inductor of the boost converter 301 may force a continuous current and by that may generate a substantial negative voltage at its input at the blanking-time during which all recycling switches S41, S4n are open. This may harm the driver circuitry 100. In order to overcome this issue, during a (notably during each) blanking-time, the recycling switch 306 S4m of the LED string 304 having the lowest storage voltage 312 across the corresponding storage unit 302 may be selected. The selected recycling switch 306 may close one of its sub-switches (e.g. its left switch) during the blanking-time (before the actual recycling switch S4x is opened), so that the body diode of the other sub-switch of the selected recycling switch 306 (e.g. the right switch) provides the inductor current during the blanking-time until the following switch S4x+1 is closed.

Figure 3B:
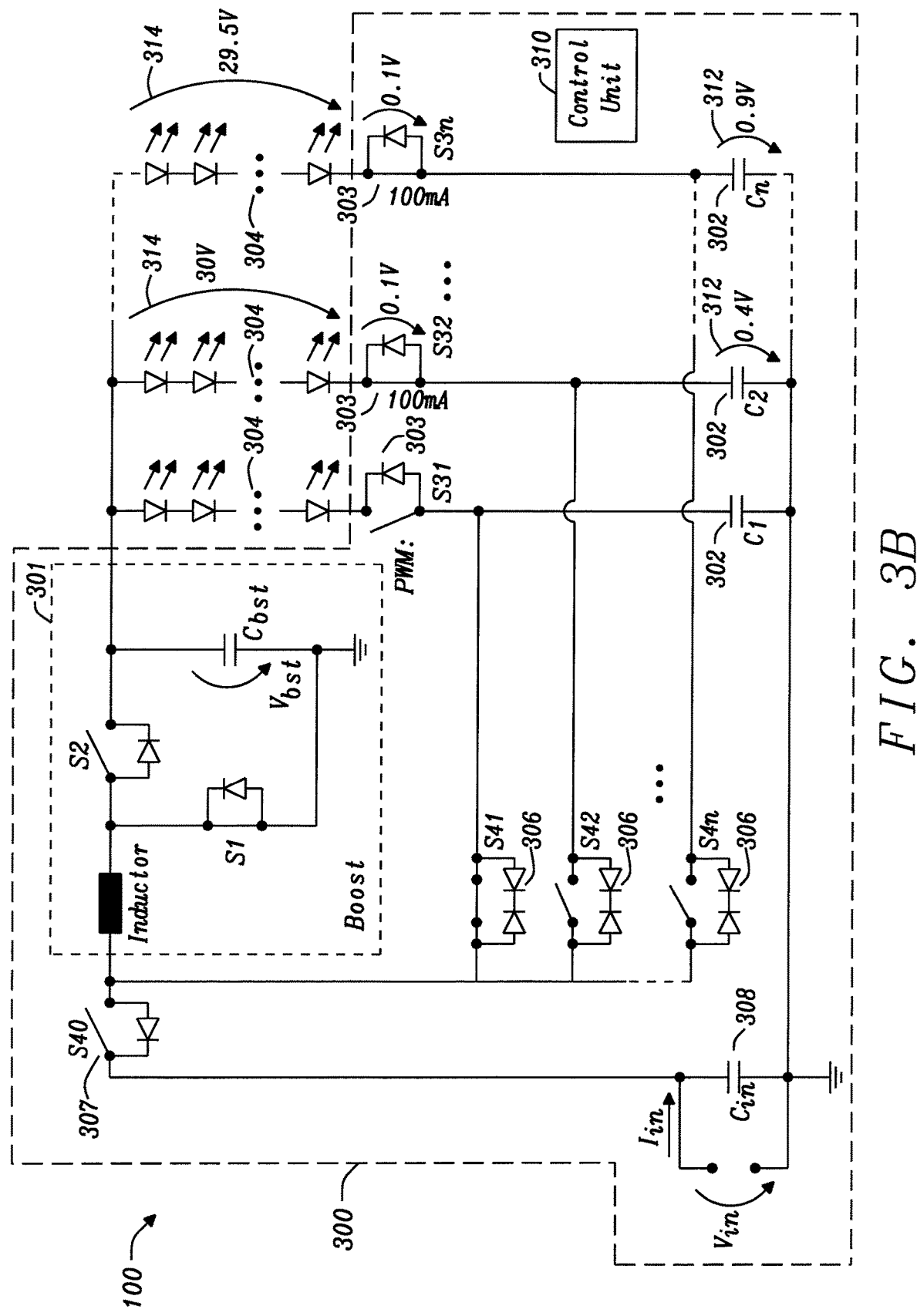
Figure 3C:
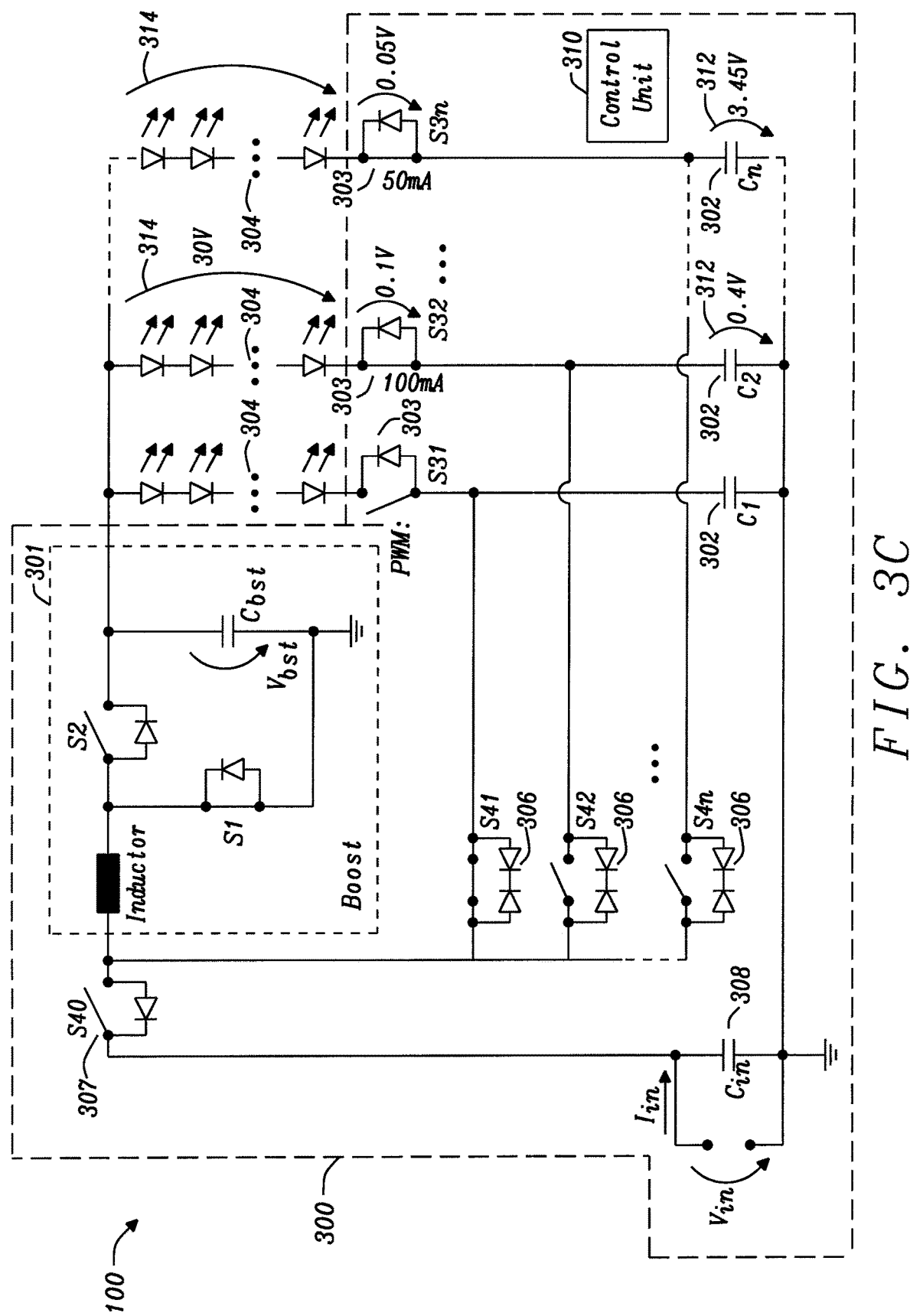

As outlined above, the natural variance of the LED dropout voltages results in dissipation power from (increased) voltages across the IDACs (and sense resistors). By using storage units 302 as illustrated in FIG. 3A individual voltages may be applied to the bottom contact of an LED string 304 (in order to compensate for the dropout voltage variations) without adding any substantial dissipation power. This is illustrated in FIG. 3B, which shows the different storage voltages 312 $V_x$, across the different storage units 302. FIG. 3C illustrates the case where the brightness of $n^{th}$ LED string is reduced by the IDAC regulating to a reduced load current (of 50 mA). It can be seen that the reduced dropout or load voltage 314 of LED string 304 n can be reliably and efficiently compensated by an increase of the storage voltage 312 $V_x$, across the storage unit 302 for the LED string 304n. The same benefit applies to the case of a short circuit of one of the LEDs in the LED string 304 n when being regulated to the same string current as flowing through the parallel LED strings.

Figure 4A:
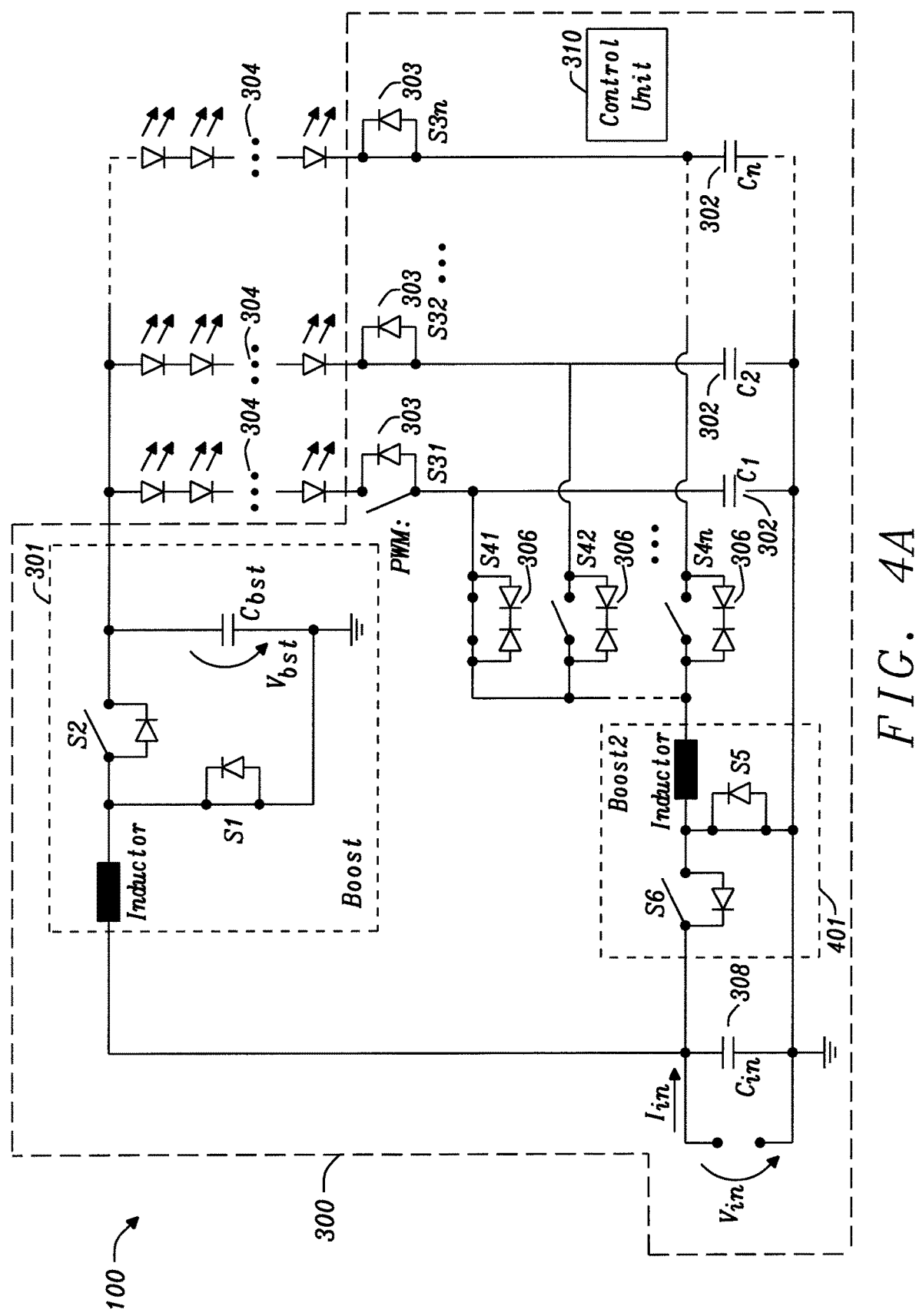
FIGS. 4A and 4B show an example lighting circuit and an example driver circuit comprising a recycling converter.

FIG. 4A shows a lighting circuit 100 and a driver circuit 300 which make use of a recycling power converter 401 (Boost 2) for discharging the storage units 302. In this case, the storage units 302 can be discharged into the input capacitor 308 $C_{in}$. By doing this, the power efficiency of the lighting circuit 100 and the driver circuit 300 may be further increased by removing the power losses incurred by the isolation switch 307 S40. Furthermore, the flexibly for recycling the charge from the storage units 302 is increased.

Figure 4B:
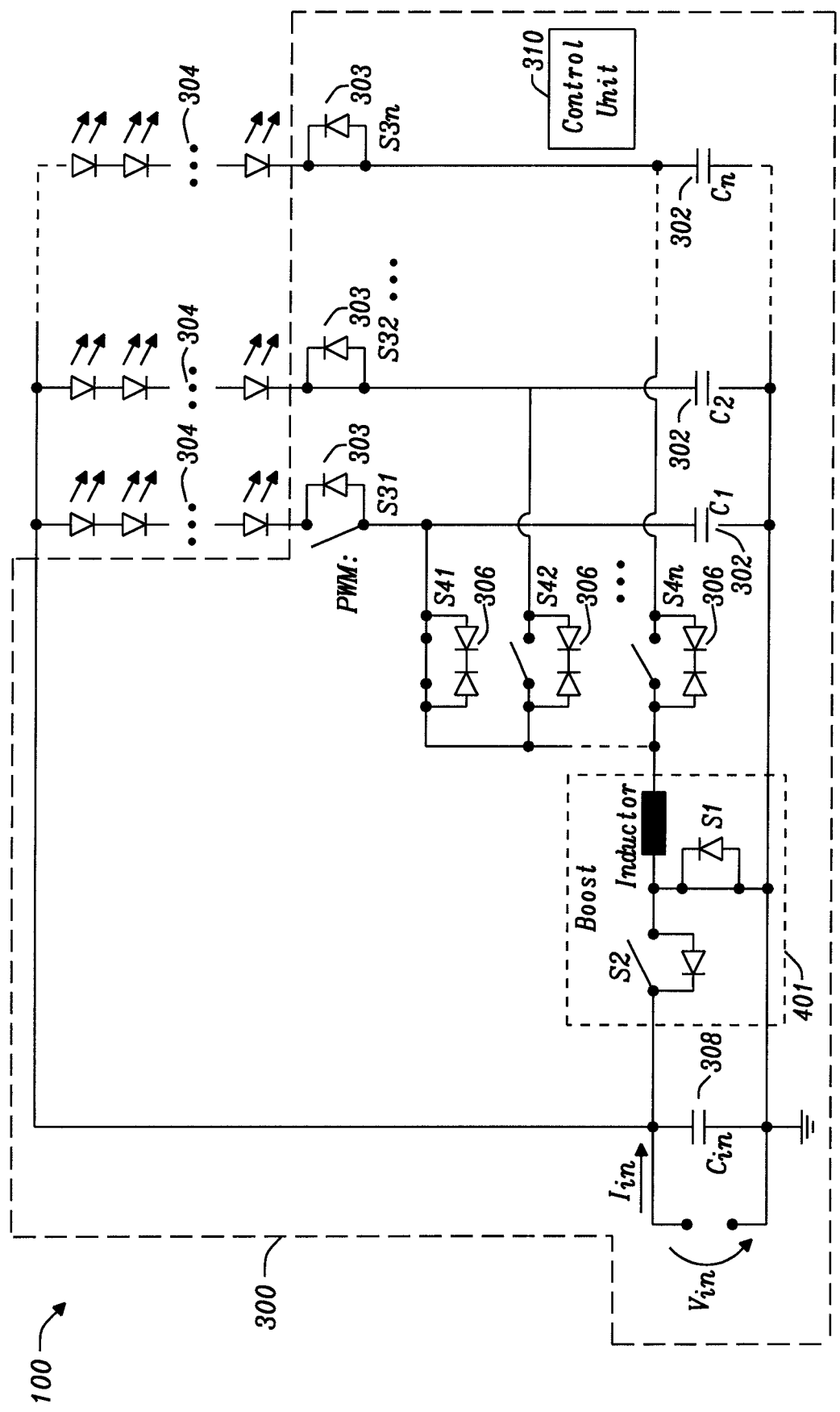

The boost converter 301 shown in FIG. 4A for providing the supply voltage 311 $V_{bst}$ for the LED strings 304 is only an example for converter topologies that may be used. FIG. 4B shows an example lighting circuit 100 and an example driver circuit 300 for an application which provides a power rail with a voltage level for a direct supply of the LED strings 304. In such a case, the power converter for providing the supply voltage 311 is not required, thereby reducing dissipation power, as well as cost and area for the Bill-of-Material (BOM).

As outlined above, when using IDACs for compensating the dropout voltage variations, the supply voltage 311 $V_{bst}$ for the LED strings 304 should be regulated tightly at a minimum voltage across the IDACs, in order to minimize dissipation power. For the lighting circuits 100 and driver circuits 300 using storage units 302, a fixed supply voltage 311 $V_{bst}$ may be used. Global dimming may then be implemented by increasing the average or target voltage $V_{ax}$ across all the storage units 302 $C_1$, to $C_n$ in parallel.

Figure 5:
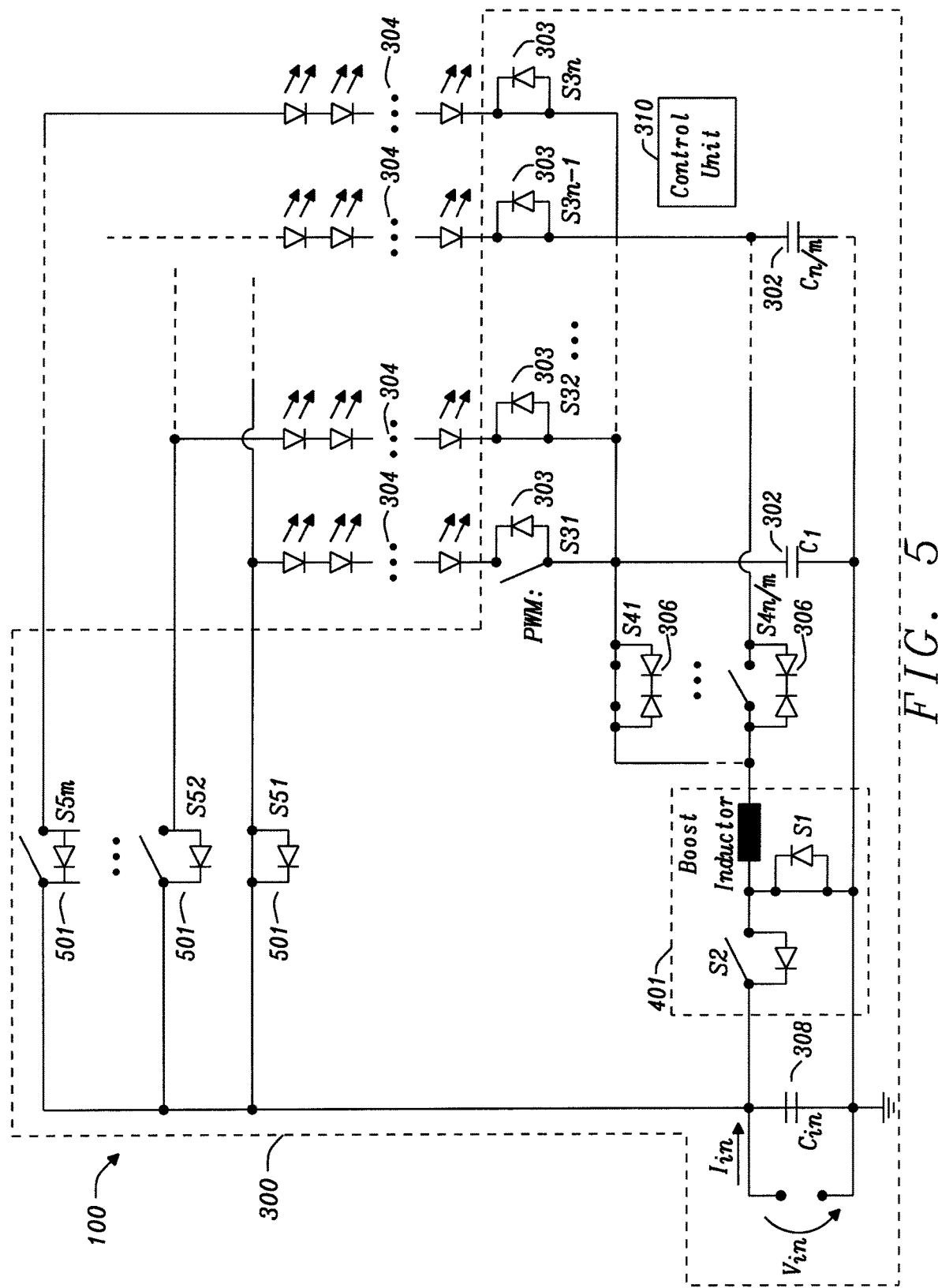
FIG. 5 illustrates an example lighting circuit comprising a matrix of LED strings.

For a relatively high number n of dimming zones, the LED driver 300 may adopt a matrix scheme. FIG. 5 shows a lighting circuit 100 and a driver circuit 300 using a matrix scheme. Each of the storage units 302 $C_1$, . . . , $C_{n/m}$, may be charged from multiple (notably m) LED strings 304 that are connected to the common supply voltage 311 through a multiplexer array at the top at the LED strings 304 (using multiplexer switches 501 S51 to S5m). The multiplexer switches 501 S51 to S5m may be closed in a mutually exclusive manner for activating a group of q=n/m LED strings 304, wherein the q=n/m LED strings 304 charge the corresponding q=n/m storage units 302 $C_1$, . . . , $C_{n/m}$. The use of a mutually exclusive operation of the groups of q LED strings 304 is typically beneficial with regards to the (simplicity and/or precision of the) Coulomb counting of the charge per LED string. By making using of a matrix scheme, the number of storage units 302 may be reduced, thereby reducing the cost and the size of the lighting circuit 100 and the driver circuit 300.

It should to be noted that LED backlight is one possible application for the driver circuit 300 described in the present document. The principle of using storage units 302 which are charged and discharged in a cyclic manner for regulating the storage voltage across the storage units 302 to individual target voltages $V_{ax}$ may also be used in other contexts. Furthermore, it should be noted that the controlled "lossless" discharge of storage units 302 $C_1$ to $C_n$ may be implemented using other types of DCDC converters (like buck converters, inverters, charge pumps using the capacitors $C_1$ to $C_n$ or similar hybrid topologies).

Hence, the present document describes a driver circuit 300 for driving a load 304, notably an LED string. In particular, the driver circuit 300 may be configured to drive a plurality of loads 304 (notably a plurality of LED strings) which are arranged in parallel strings to one another and which exhibit different dropout or threshold voltages. In other words, the different loads 304 may exhibit different functional relationships between the load current through the load 304 and the load voltage 314 across the load 304. In particular, the different functional relationships may be offset with respect to one another.

The driver circuit 100 comprises a power supply 301 configured to provide electrical power at a supply voltage 311. The power supply 301 may comprise a power rail which is configured to (directly) provide power at the supply voltage 311. Alternatively or in addition, the power supply 301 may comprise a supply power converter which is configured to convert power that is provided at an input port of the supply power converter into DC (Direct Current) power at the (substantially constant) supply voltage 311.

Furthermore, the driver circuit 300 comprises a PWM control switch 303 which is configured to enable and to disable a load current through the load 304 in an alternating manner. In particular, the PWM control switch 303 may be opened to interrupt the load current. Furthermore, the PWM control switch 303 may be closed to enable the load current through the load 304. The PWM control switch 303 may enable and disable the load current repeatedly within a sequence of cycles (also referred to herein as refresh cycles). Typical cycle frequencies may be at 100 Hz, 200 Hz, 400 Hz or more.

The load 304 may be or may comprise an LED string and the brightness of the LED string may be set and/or adapted within each cycle of the sequence of cycles. For this purpose, a duty cycle of the PWM control switch 303 may be used to set and/or adapt the cumulated load current through the LED string within each cycle.

Furthermore, the driver circuit 300 comprises a storage unit 302 which is configured to be charged using the load current through the load 304. In other words, the load current which flows through the load 304 may be stored as a cumulated charge within the storage unit 302. The storage unit 302 may comprise or may be one or more capacitors.

The load 304, the PWM control switch 303 and the storage unit 302 form a serial arrangement, wherein the serial arrangement may be arranged in parallel to the supply voltage 311. In other words, the PWM control switch 303 and the storage unit 302 may be arranged in series, to form a partial serial arrangement. This partial serial arrangement may be arranged such that by adding the load 304, a serial arrangement is formed that is arranged in parallel to the supply voltage 311. Hence, the total voltage drop across the serial arrangement may be equal to the supply voltage 311. By forming a serial arrangement comprising the load 304, the load current through the load 304 may efficiently be stored within the storage unit 302.

In addition, the driver circuit 300 comprises a sensing unit 305 which is configured to provide a charge indication which is indicative of a cumulated load current through the load 304. In other words, the sensing unit 305 may be configured to monitor the cumulated load current that flows through the load 304 during each cycle of a sequence of cycles.

The storage unit 302 may be such that a storage voltage 312 across the storage unit 302 increases as the electrical charge, which is stored in the storage unit 302, increases, and vice versa. In particular, there may be a (known) functional relationship between the storage voltage 302 and the cumulated charge within the storage unit 302. This functional relationship may be linear (as is the case e.g. for a capacitor). In such a case, the storage voltage 302 may be used as a charge indication. In particular, the sensing unit 305 may comprise means for sensing the storage voltage 312 for determining the charge indication.

Alternatively or in addition, the sensing unit 305 may comprise a Coulomb counter. In particular, the sensing unit 305 may comprise a current mirror which is configured to mirror the load current through the load 304 and/or the load current through the PWM control switch 303, to provide a mirrored current of the load current. Furthermore, the sensing unit 305 may comprises a mirror capacitor which is arranged to be charged using the mirrored current. In addition, the sensing unit 305 may comprise a voltage sensor which is configured to sense a voltage across the mirror capacitor for determining the charge indication. Such a sensing unit 305 may be used to provide a precise indication of the cumulated load current, even if the charging and the discharging of the storage unit 302 overlap.

Furthermore, the driver circuit 300 comprises a recycling switch 306 which is configured to couple or to decouple the storage unit 302 to or from the power supply 301 in an alternating manner, in order to at least partially discharge the storage unit 302 towards the power supply 301. In particular, the recycling switch 306 may be closed to couple the storage unit 302 with the power supply 301, thereby allowing a current to flow from the storage unit 302 towards the power supply 301 to discharge the storage unit 302. The recycling switch 306 may be configured to block currents flowing in both directions.

The current that flows to the power supply 301 may be reused by the power supply 301 to drive the load 304. As a result of this, a power efficient driver circuit 300 may be provided. In particular, power dissipation of the driver circuit 300 may be reduced.

The driver circuit 300 further comprises a control unit 310 which is configured to, repeatedly within a sequence of cycles, control the PWM control switch 303 and the recycling switch 306 based on the charge indication and based on a target charge value for the cumulated load current through the load 304 within a cycle. In particular, the PWM control switch 303 and the recycling switch 306 may be controlled such that the cumulated load current through the load 304 within a cycle corresponds to the target charge value.

For each cycle a (possibly different) target charge value may be defined. The target charge value may be indicative of the target brightness of an LED string. The duty cycle of the PWM control switch 303 for a particular cycle may be adapted to modify the time interval during which the load current flows through the load 304. The duty cycle of the recycling switch 306 for a particular cycle may be adapted to modify the (average) load voltage 314 across the load 304, thereby affecting the level of the load current through the load 304.

The cumulated load current within a particular cycle typically corresponds to the integral of the load current over time. Hence, the cumulated load current may be modified by the duty cycle of the PWM control switch 303 and by the duty cycle of the recycling switch 306. Hence, the combined control of the PWM control switch 303 and the recycling switch 306 allows the cumulated load current to be set and/or adapted in a precise and power efficient manner.

The control unit 310 may be configured to control the PWM control switch 303 and the recycling switch 306 such that the storage unit 302 is charged via the load 304 and discharged towards the power supply 301 in a mutually exclusive manner. By doing this, an efficient monitoring of the cumulated load current within the different cycles is enabled. In particular, the mutually exclusive charging and discharging of the storage unit 302 allows the charge indication to be determined directly at the storage unit 302 (e.g. using a voltage sensor).

The control unit 310 may be configured to determine a target indication which is indicative of the target charge value for a cycle. As outlined above, the target charge value may be set individually for each cycle, e.g. in order to adapt the brightness of an LED string. The target indication may comprise a digital value (e.g. a Q bit value) allowing the target charge value to be set with a certain resolution. The duty cycle of the PWM control switch 303 for a particular cycle may be set based on the target indication for the particular cycle. By doing this, the cumulated load current through the load 304 may be adapted in an efficient and precise manner on a cycle-by-cycle basis.

As indicated above, the storage unit 302 may be such that the storage voltage 312 across the storage unit 302 increases as the electrical charge, which is stored in the storage unit 302, increases, and decreases as the electrical charge decreases. Furthermore, the load 304 may be such that the load current through the load 304 decreases as the load voltage 314 across the load 304 decreases (and/or such that the load current through the load 304 increases as the load voltage 314 across the load 304 increases).

The supply voltage 311 typically comprises the sum of the storage voltage 312 and the load voltage 314. In particular, the supply voltage 311 may correspond to the sum of the storage voltage 312, the load voltage 314 and the voltage drop across the PWM control switch 303, wherein the voltage drop across the PWM control switch 303 is typically relatively small (compared to the load voltage 314) and typically constant (during the time intervals when the PWM control switch 303 is closed to enable the load current). Hence, an increase of the storage voltage 312 may lead to a decrease of the load voltage 314, and a decrease of the storage voltage 312 may lead to an increase of the load voltage 314. Consequently, the level of the storage voltage 312 may be used to control the level of the load voltage 314, wherein the level of the load voltage 314 typically impacts the level of the load current (as outlined above).

The control unit 310 may be configured to control the recycling switch 306 in dependence of a target storage voltage $V_{ax}$ for the storage voltage 312 of the storage unit 302. In particular, the recycling switch 306 may be controlled such that the average storage voltage 312 during a cycle corresponds to the target storage voltage $V_{ax}$ or such that a minimum value of the storage voltage 312 during a cycle corresponds to the target storage voltage $V_{ax}$. Hence, the recycling switch 306 may be used to adapt the level of the load current, thereby affecting the level of the cumulated load current during a cycle. Hence, the recycling switch 306 may (also) be used to control the brightness of an LED string, thereby increasing the dynamic range of a lighting circuit 100.

As outlined above, the control unit 310 may be configured to determine a target indication which is indicative of the target charge value for a particular cycle. The target indication may change on a cycle-by-cycle basis. The target storage voltage $V_{ax}$ for the particular cycle may be set based on the target indication. In particular, the target indication (e.g. one or more bits of the Q bit data word) may be used to adapt the target storage voltage $V_{ax}$ in order to adapt the level of the load current. Furthermore, the target indication (e.g. one or more bits of the Q bit data word) may be used to adapt the duty cycle of the PWM control switch, in order to adapt the duration of the load current. Hence, the adaption of the target storage voltage $V_{ax}$ for the storage unit 302 may be used to increase the resolution for setting the target charge value.

The power supply 301 may comprise a DC/DC supply power converter (e.g. a boost or a buck converter) which is configured to derive electrical power at the supply voltage 311 from electrical power at an input voltage $V_{in}$. The charge from the storage unit 302 may be provided through the recycling switch 306 to the input port of the DC/DC supply power converter. For this purpose, the power supply 301 may comprise an isolation switch 307 which is configured to couple or to decouple the input port of the DC/DC supply power converter to or from the input voltage $V_{in}$. The recycling switch 306 may be configured to couple or to decouple the storage unit 302 to or from the input port of the DC/DC supply power converter.

The control unit 310 may be configured to control the isolation switch 307 and the recycling switch 306 such that the input port is coupled to the input voltage $V_{in}$ or to the storage unit 302 in a mutually exclusive manner. Furthermore, the control unit 310 may be configured to adapt operation of the DC/DC supply power converter depending on whether the input port is coupled to the input voltage $V_{in}$ or to the storage unit 302. By doing this, the charge from the storage unit 302 may be recycled in a reliable manner.

The driver circuit 300 may comprise a recycling power converter 401 (e.g. a buck or a boost converter) which is arranged between the recycling switch 304 and a storage element 308 (e.g. a capacitor) of the power supply 301. By way of example, the power supply 301 may comprise an input capacitor for stabilizing the input voltage $V_{in}$ as a storage element 308. Alternatively, the power supply 301 may comprise a supply voltage capacitor for stabilizing the supply voltage 314 (e.g. at the output of the supply voltage converter) as a storage element 308.

The control unit 310 may be configured to control the recycling power converter 401 such that the storage element 308 is charged using the electrical charge from the storage unit 302. By doing this, the charge from the storage unit 302 may be recovered in an efficient and flexible manner.

Typically, the driver circuit 300 is configured to drive a plurality of loads 304, notably q loads 304, with q being an integer, with q>1. For this purpose, the driver circuit 300 may comprise q PWM control switches 303, q storage units 302 and q sensing units 305 and q recycling switches 306 for the q different loads 304, respectively. The q loads 304, the q PWM control switches 303 and the q storage units 302 may form q serial arrangements, respectively, each serial arrangement being arranged in parallel to the power supply 301.

The control unit 310 may be configured to control the q PWM control switches 303 and the q recycling switches 306 based on the q charge indications and based on q target charge values, respectively. The q target charge values may be set independently from one another, e.g. in order to set the brightness of q different LED strings. Furthermore, the q target charge values may be adapted on a cycle-by-cycle basis. The q PWM control switches 303 and the q recycling switches 306 may be controlled such that the cumulated load current through the q loads 304 within a cycle correspond to q target charge values, respectively. Hence, the driver circuit 300 may be used to efficiently and precisely drive q different loads 304 (e.g. q different LED strings).

The control unit 310 may be configured to control the q recycling switches 306, such that the q storage units 302 are coupled with the power supply 301 in a mutually exclusive manner By doing this, the different loads 304 may be controlled in a particularly reliable and precise manner (without affecting each other). In particular, by doing this, it may be avoided that two or more of the q storage units 302 are coupled such that current flows from one of the storage unit 302 to another one of the storage units 302.

The driver circuit 300 may be configured to drive m loads 304 in a multiplexed manner, with m being an integer, with m>1. The multiplexed operation of m loads 304 may be combined with the above mentioned operation of q parallel loads 304, such that the driver circuit 300 is enabled to drive a total of n=q×m loads 304. By making use of a multiplexing scheme for driving m loads 304, the cost and the size of the driver circuit 300 may be reduced.

For enabling the multiplexed operation of a group of m loads 304, the driver circuit 300 may comprise m multiplex switches 501 which are configured to couple or to decouple the m different loads 304 to or from the power supply 301. Furthermore, the driver circuit 300 may comprises m PWM control switches 303 for enabling or disabling the load current through the m loads 304, respectively.

The load current through the m loads 304 may be used to charge a single storage unit 302. The storage unit 302 may form a serial arrangement with each of the m multiplex switches 501, them loads 304 and them PWM control switches 303. Each of these serial arrangements may be arranged in parallel to the supply voltage 301, when the respective multiplex switch 501 is closed.

The control unit 310 may be configured to control the multiplex switches 501 such that during a cycle each of the m loads 304 is coupled to the power supply 301 at least ones (to provide a load current to the respective load 304). In particular, the control unit 310 may be configured to control the multiplex switches 501 such that during a cycle each of the m loads 304 is coupled to the power supply 301 in a mutually exclusive manner. As indicated above, the mutually exclusive operation of the m loads 304 may be beneficial with regards to Coulomb counting of the cumulated load current for each of them loads 304. Each of the m loads 304 may be coupled to the supply voltage 301 at least once during a cycle. This may be the case for each cycle of a sequence of cycles. In other words, each of the m loads 304 may be activated at least once during a cycle. The load current through the (single) activated load 304 may then be used to charge the storage unit 302. The storage unit 302 may be at least partially discharged one or more times during a cycle, each in between the activation of different ones of the m loads 304. By doing this, defined operation conditions may be set for each of the m loads 304.

Figure 7:
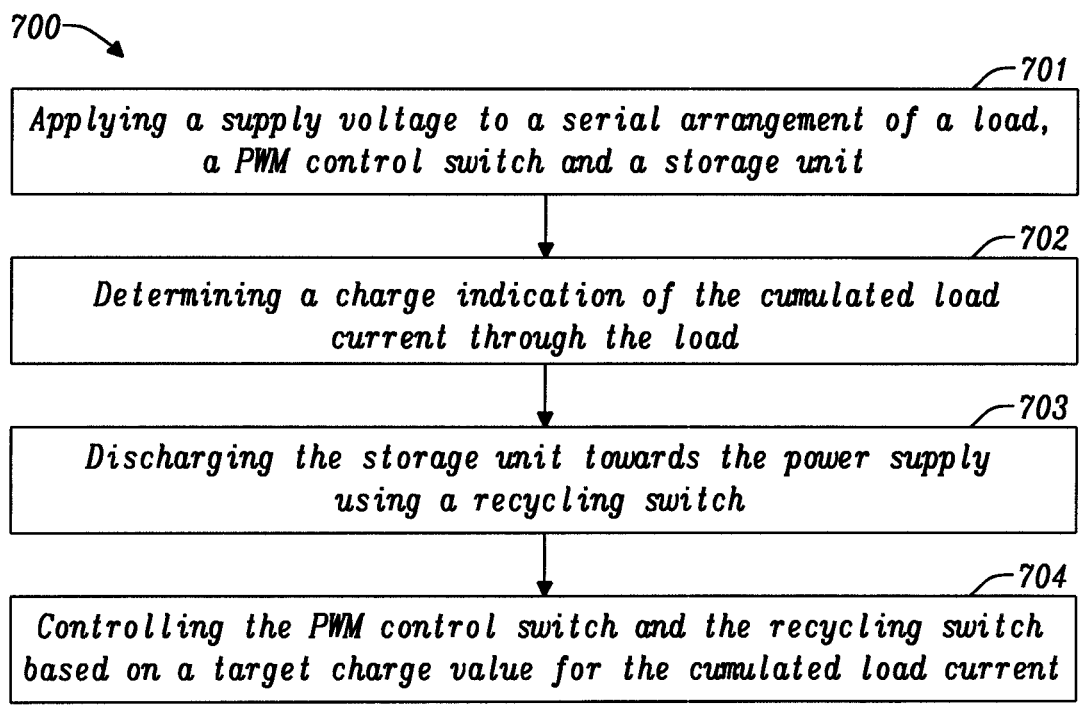
FIG. 7 shows a flow chart of an example method for driving a load, notably an LED string.

FIG. 7 shows a flow chart of an example method 700 for driving a load 304. The method 700 comprises applying 701 a supply voltage 311 to a serial arrangement of the load 304, a PWM control switch 303 and a storage unit 302, using a power supply 301. The PWM control switch 303 is configured to enable and to disable a load current through the load 304 in an alternating manner. Furthermore, the storage unit 302 is configured to be charged with the load current through the load 304.

The method 700 further comprises providing 702 a charge indication which is indicative of a cumulated load current through the load 304. In addition, the method 700 comprises discharging 703 the storage unit 302 at least partially towards the power supply 301, using a recycling switch 306, wherein the recycling switch 306 is configured to couple and to decouple the storage unit 302 to and from the power supply 301 in an alternating manner.

In addition, the method 700 comprises controlling 704 the PWM control switch 303 and the recycling switch 306 repeatedly within a sequence of cycles, based on the charge indication and based on a target charge value for the cumulated load current through the load 304 within a cycle.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A driver circuit for driving a load; wherein the driver circuit comprises,
   a power supply configured to provide electrical power at a supply voltage;
   a PWM control switch configured to enable and to disable a load current through the load in an alternating manner;
   a storage unit configured to be charged using the load current through the load; wherein the load, the PWM control switch and the storage unit form a serial arrangement, which is arranged in parallel to the supply voltage;
   a sensing unit configured to provide a charge indication which is indicative of a cumulated load current through the load;
   a recycling switch configured to couple and to decouple the storage unit to or from the power supply in an alternating manner, in order to at least partially discharge the storage unit towards the power supply; and
   a control unit configured to, repeatedly within a sequence of cycles, control the PWM control switch and the recycling switch based on the charge indication and based on a target charge value for the cumulated load current through the load within a cycle, notably such that the cumulated load current through the load within a cycle corresponds to the target charge value.

2. The driver circuit of claim 1, wherein the control unit is configured to control the PWM control switch and the recycling switch such that the storage unit is charged via the load and discharged towards the power supply in a mutually exclusive manner.

3. The driver circuit of claim 1, wherein the control unit is configured to
   determine a target indication indicative of the target charge value for a cycle; and
   set a duty cycle of the PWM control switch for the cycle based on the target indication.

4. The driver circuit of claim 1, wherein
   the storage unit is such that a storage voltage across the storage unit increases as the electrical charge, which is stored in the storage unit, increases, and vice versa;
   the load is such that the load current through the load decreases as a load voltage across the load decreases;
   the supply voltage comprises the sum of the storage voltage and the load voltage; and
   the control unit is configured to control the recycling switch in dependence of a target storage voltage ($V_{ax}$) for the storage voltage of the storage unit, notably such that the average storage voltage during a cycle corresponds to the target storage voltage or such that a minimum value of the storage voltage during a cycle corresponds to the target storage voltage.

5. The driver circuit of claim 4, wherein the control unit is configured to determine a target indication indicative of the target charge value for a cycle; and set the target storage voltage for the cycle based on the target indication.

6. The driver circuit of claim 1, wherein the power supply comprises a DC/DC supply power converter configured to derive electrical power at the supply voltage from electrical power at an input voltage;

the power supply comprises an isolation switch configured to couple or to decouple an input port of the DC/DC supply power converter to or from the input voltage;

the recycling switch is configured to couple or to decouple the storage unit to or from the input port of the DC/DC supply power converter; and the control unit is configured to control the isolation switch and the recycling switch such that the input port is coupled to the input voltage or to the storage unit in a mutually exclusive manner.

7. The driver circuit of claim 6, wherein the control unit is configured to adapt operation of the DC/DC supply power converter depending on whether the input port is coupled to the input voltage or to the storage unit.

8. The driver circuit of claim 1, wherein the driver circuit comprises a recycling power converter arranged between the recycling switch and a storage element of the power supply; and the control unit is configured to control the recycling power converter such that the storage element is charged using an electrical charge from the storage unit.

9. The driver circuit of claim 1, wherein the storage unit is such that a storage voltage across the storage unit increases as the electrical charge, which is stored in the storage unit, increases, and vice versa; and the sensing unit comprises means for sensing the storage voltage for determining the charge indication.

10. The driver circuit of claim 1, wherein the sensing unit comprises, a Coulomb counter; and/or a current mirror configured to mirror the load current through the load and/or the PWM control switch, to provide a mirrored current;

a mirror capacitor arranged to be charged using the mirrored current; and a voltage sensor configured to sense a voltage across the mirror capacitor for determining the charge indication.

11. The driver circuit of claim 1, the driver circuit comprises q PWM control switches, q storage units and q sensing units and q recycling switches for q different loads;

q is an integer, with q>1;

the q loads, the q PWM control switches and the q storage units form q serial arrangements, respectively, each being arranged in parallel to the power supply; and the control unit is configured to control the q PWM control switches and the q recycling switches based on the q charge indications and based on q target charge values, respectively, notably such that the cumulated load current through the q loads within a cycle correspond to q target charge values, respectively.

12. The driver circuit of claim 10, wherein the control unit is configured to control the q recycling switches, such that the q storage units are coupled with the power supply in a mutually exclusive manner.

13. The driver circuit of claim 1, wherein the driver circuit comprises m multiplex switches configured to couple or to decouple m different loads to or from the power supply;

m is an integer, with m>1;

the driver circuit comprises m PWM control switches;

the storage unit forms a serial arrangement with each of the m multiplex switches, the m loads and the m PWM control switches; and the control unit is configured to control the multiplex switches such that during a cycle each of the m loads is coupled to the power supply at least ones, notably in a mutually exclusive manner.

14. The driver circuit of claim 1, wherein the load comprises an LED string; and/or the recycling switch is configured to block currents flowing in both directions.

15. A method for driving a load; wherein the method comprises, applying a supply voltage to a serial arrangement of the load, a PWM control switch and a storage unit, using a power supply; wherein the PWM control switch to enable and to disable a load current through the load in an alternating manner; wherein the storage unit to be charged with the load current through the load;

providing a charge indication which is indicative of a cumulated load current through the load;

at least partially discharging the storage unit towards the power supply, using a recycling switch to couple and to decouple the storage unit to and from the power supply in an alternating manner; and controlling the PWM control switch and the recycling switch repeatedly within a sequence of cycles, based on the charge indication and based on a target charge value for the cumulated load current through the load within a cycle, notably such that the cumulated load current through the load within a cycle corresponds to the target charge value.

* * * * *

UNITED STATES PATENT AND TRADEMARK OFFICE
CERTIFICATE OF CORRECTION

| | | |
|---|---|---|
| PATENT NO. | : 10,734,897 B2 | Page 1 of 1 |
| APPLICATION NO. | : 16/700279 | |
| DATED | : August 4, 2020 | |
| INVENTOR(S) | : Holger Petersen | |

It is certified that error appears in the above-identified patent and that said Letters Patent is hereby corrected as shown below:

On the Title Page

Item [30], delete "0 2018 202 871" and replace with -- 10 2018 202 871 --.

Signed and Sealed this
Third Day of January, 2023

Katherine Kelly Vidal
*Director of the United States Patent and Trademark Office*